(12) United States Patent
Wong et al.

(10) Patent No.: US 7,874,036 B2
(45) Date of Patent: Jan. 25, 2011

(54) ENERGY STORAGE BRIDGE

(76) Inventors: Carlos Wong, 17 Largo Do Leal Senado, Macau (MO); Livia Wong, 17 Largo Do Leal Senado, Macau (MO); Zhaohui Xiong, Rm 301, 14-3 Xuefu Road, Harbin, Heilongjiang (CN)

( * ) Notice: Subject to any disclaimer, the term of this patent is extended or adjusted under 35 U.S.C. 154(b) by 217 days.

(21) Appl. No.: 12/211,194

(22) Filed: Sep. 16, 2008

(65) Prior Publication Data

US 2010/0064674 A1    Mar. 18, 2010

(51) Int. Cl.
  *E01D 1/00* (2006.01)
(52) U.S. Cl. .......................... 14/78; 290/1 R
(58) Field of Classification Search .................. 14/78; 290/1 R; 60/327, 721; 404/71
  See application file for complete search history.

(56) References Cited

U.S. PATENT DOCUMENTS

| | | | | |
|---|---|---|---|---|
| 728,056 | A * | 5/1903 | Wansbrough | 404/71 |
| 2,184,137 | A * | 12/1939 | Brewer | 52/223.7 |
| 3,939,356 | A * | 2/1976 | Loane | 290/52 |
| 4,147,204 | A * | 4/1979 | Pfenninger | 165/4 |
| 4,237,692 | A * | 12/1980 | Ahrens et al. | 60/659 |
| 4,248,043 | A * | 2/1981 | Stewart, Sr. | 60/325 |
| 4,275,310 | A * | 6/1981 | Summers et al. | 290/1 R |
| 4,849,648 | A * | 7/1989 | Longardner | 290/54 |
| 5,863,148 | A * | 1/1999 | Shivaram | 404/28 |
| 6,026,349 | A * | 2/2000 | Heneman | 702/60 |
| 6,107,693 | A * | 8/2000 | Mongia et al. | 290/52 |
| 6,313,544 | B1 * | 11/2001 | Mongia et al. | 290/52 |
| 6,484,799 | B1 * | 11/2002 | Irish | 165/287 |

* cited by examiner

*Primary Examiner*—Gary S Hartmann

(57) ABSTRACT

An energy storage bridge includes a plurality of bridge girders. The bridge girder includes a number of steel pipes and a plurality of web plates. The steel pipes are assembled either in a single row or in multiple rows in the structural depth direction to form the girder together with the web plate welded between the two halves of the pipe; or with two web plates welded to each side of the pipe. The bridge girder forms an energy storage unit between two consecutive movement joints of the bridge, and two consecutive storage units can be joined by high pressure flexible pipe to form a giant energy storage unit.

4 Claims, 16 Drawing Sheets

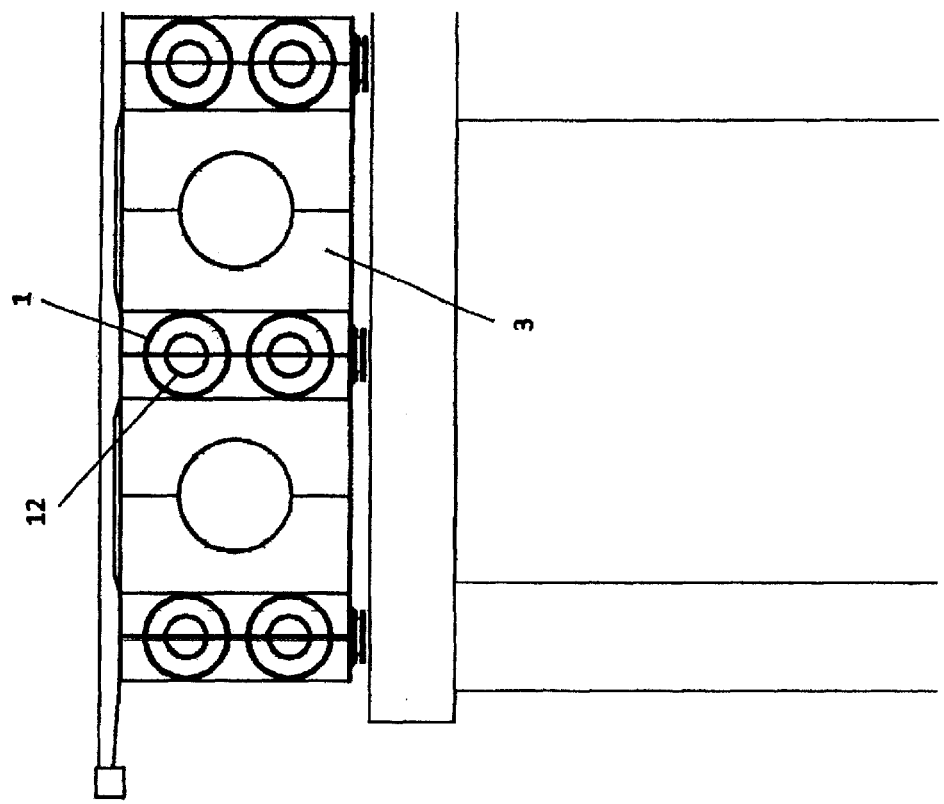
FIG. 5
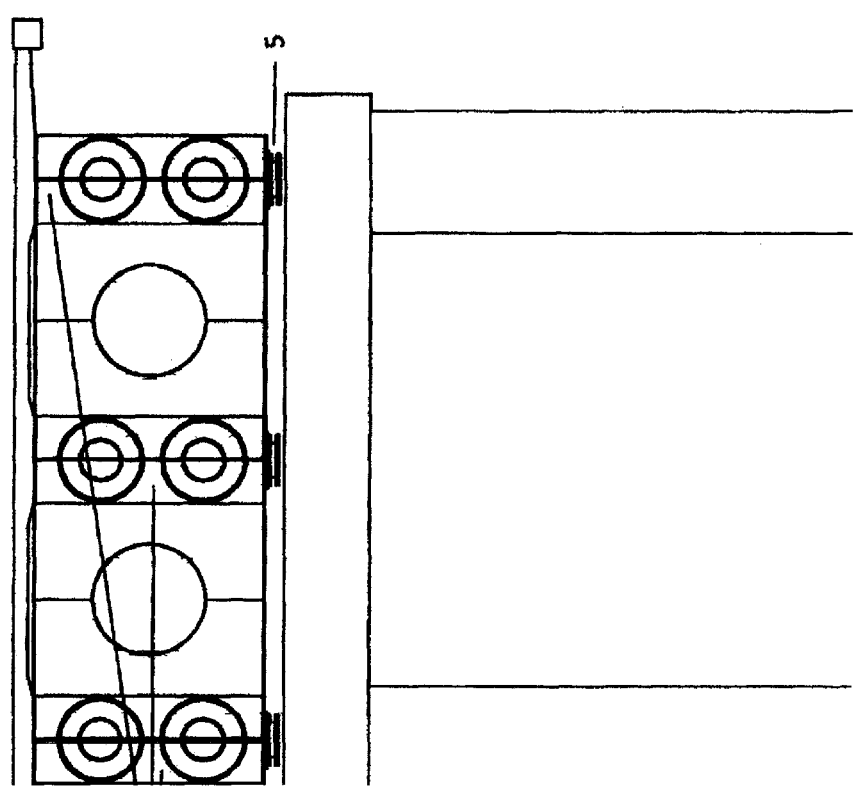
SECTION 3-3

DETAIL C

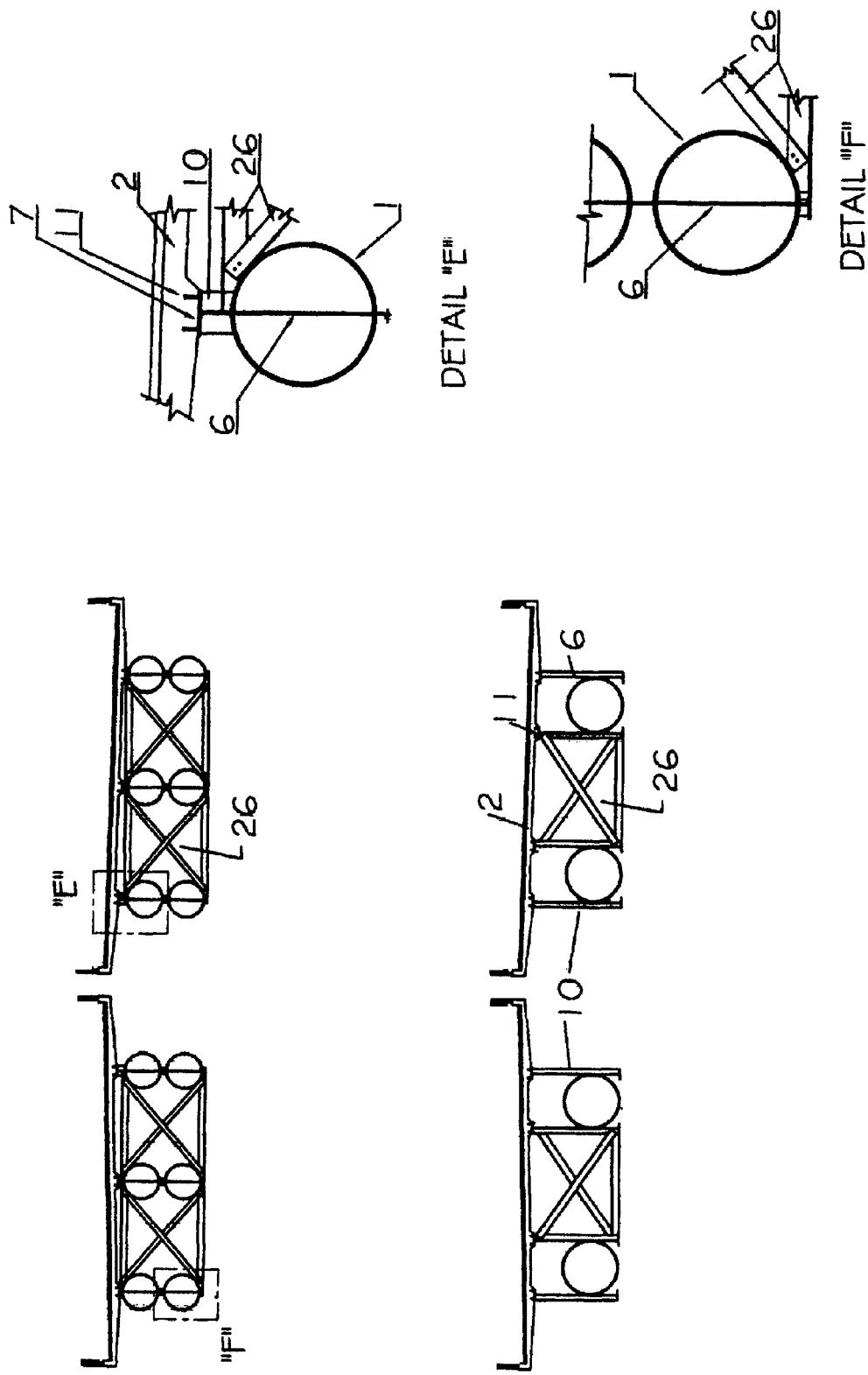

ENERGY STORAGE BRIDGE

INTRODUCTION

The invention relates to a new bridge structural form using steel pipes instead of the traditional beams as load-carrying girders and in addition as a Compressed Air Energy Storage (CAES) units, to store the energy of unwanted electricity in the grid during low-demand sessions, or the intermittent power of any regenerated energy sources. The stored energy is later converted back to electricity when it is needed or to make use of the compressed air to produce cool air for indoor environmental temperature control using Air Cycle Air Conditioning (ACAC) technology.

BACKGROUND OF THE INVENTION

Underground caverns have been used for Compressed Air Energy Storage in power plants first in Germany Huntorf in 1978 (Crotogino et al 2001)[1] and later in McIntosh power plant of Alabama, USA in 1991 (Linden 2003)[2]. The Energy Storage Unit of a power plant is to regulate the mismatching supply and demand of the grid power, such that the electricity would not be wasted when it is not needed. To store the equivalent energy of a power plant, a sizable container is needed. Surface mounted or buried steel pipes have been proposed for small energy storage units (Linden 2003)[2]. Suitable underground caverns are difficult to find. Bridge structures are plentiful in many cities and their body space (spacing between girders) is voluminous. If steel pipes are used to store energy, they can be used as load-carrying beams/girders. The key to the application is that the steel pipe when subject to internal air pressure, the pipe is under tension. The hoop stress is twice as much as the axial stress, see FIG. 15. If the design is to limit the hoop stress to the yield stress, the axial stress is only half of the yield stress, leaving another half of the yield stress to be mobilized to carry loads. As the air pressure is very high in order to store sufficient energy, the thickness of the steel pipe is sizable. The mobilized tension force in the pipe (half of the yield stress times sectional area) is large enough to resist the vehicle load. The mass energy storage scheme can be implemented in the sea-crossing bridges such as the Sunshine Bridge, whilst small energy storage schemes can be placed in many road bridges in cities. The invention presented here is to turn the bridge body space into energy storage container but at the same time maintaining its bridge function, i.e. carrying vehicle loads from A to B over a horizontal distance.

[1] Crotogino, F., Mohemeyer, K-U and Scharf, R., "Huntorf CAES: More than 20 years of Successful Operation", Spring 2001 Meeting, Orlando, Fla., USA.
[2] van der Linden, S., "The Commercial World of Energy Storage: A Review of Operating Facilities (under construction or planned)", 1st Annual Conference of Energy Storage Council, Houston, Tex., March, 2003.

BRIEF SUMMARY OF THE INVENTION

The invention is a bridge consisting of air-tight steel pipes, which are used to store the compressed air as stored energy, and used as the load carrying structural elements of the bridge. The stored energy can be the unwanted grid power or the intermittent regenerated energy sources. When the energy is needed, the compressed air is released to convert back to electricity, or make use of the compressed air to produce cool air for indoor environmental temperature control using Air Cycle Air Conditioning (ACAC) technology.

DETAILED DESCRIPTION OF THE INVENTION

To store mass energy only two methods are available: pumped Hydro-electric plant and Compressed Air Energy Storage (CAES). Pumped Hydro-electric plant requires two reservoirs at different levels but its application is restricted by natural terrain. The electricity is stored as potential energy. Compressed Air Energy Storage (CAES) is to compress the air to a high pressure (80 bars in Huntorf plant). Air is abundant in the atmosphere and in CAES method the only hurdle is the compressed air container.

The invention is a response to the mass energy storage using underground caverns attached to power plants as in the case of Huntorf plant of Germany and in the case of McIntosh plant of Alabama, to regulate the supply and demand of the grid power. Both plants use underground caverns at a depth of 650-850 m (Huntorf) below ground and 450 m (McIntosh) below ground level. Apart from economical benefit from operating the power plant with a mass energy storage unit, the energy saving scheme also help to cut the green house gases, and such scheme should be encouraged. However, suitable natural underground caverns are not easy to come by hence alternative method of using steel pipes buried underground is proposed by Linden 2003.

Bridge structure usually consists of two parts: the girders which can be concrete or steel, and the roadway slab, which is generally made of concrete. The girder needs adequate structural depth, normally in 1/15 to 1/25 of the span. The width of the bridge depends on how many traffic lanes it is to carry. One traffic lane takes up a width of 3.5 m to 3.75 m depending on the countries' standards. The width of the roadway is about 15-16 m, for 3 lanes plus hard shoulder. For a span of typically 35-70 m, the depth is somewhere between 2.3-3.5 m. A box of 3.0 m×8 m=24 m² to 4.0 m×8.0 m=32 m² is the typical internal area of the cross-section of box girder. This figure will be doubled in dual carriageway bridges. Many bridges are constructed in great length. The available volume (sectional area times length) is great.

The air volume is provided in the internal void of a box girder or between beams. A rectangular box type structure is not suitable for resisting high air pressure (up to 100 bars, or 10 MN/m²) as it produces unfavorable bending effects. To resist the high air pressure, steel pipes are the only choice, since the internal pressure will produce only in-plane tensile stress, which is a stress to be more favorable than the bending stress, for the steel plate.

Figure 1:
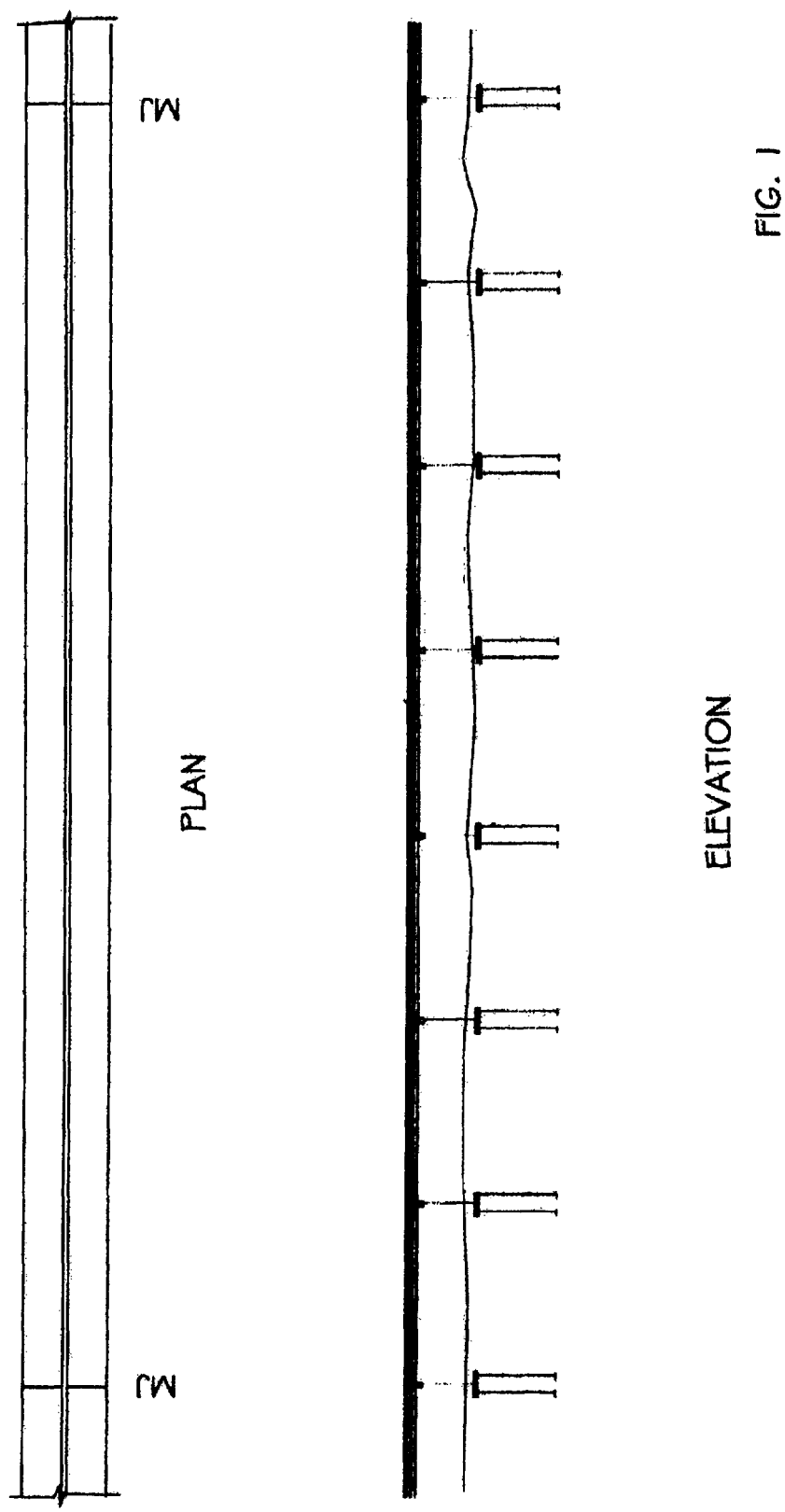
FIG. 1 Plan and Elevation of Energy Storage Bridge
FIG. 2 Plan and Elevation of a segment of typical span of the Energy Storage Bridge
FIG. 3 Bottom Plan View of the Segment of the Energy Storage Bridge
FIG. 4 Section 1 and Section 2 through the deck
FIG. 5 Section 3 through the deck close to bridge bearing support
FIG. 6 Detail A showing the elevation of the structure and energy storage elements at the bridge bearing support
FIG. 7 A segment showing the deck assembly
FIG. 8 Isometric view of support grinders and the energy storage pipes
FIG. 9 Detail B showing isometric view of the intermediate diaphragm and the air pressure release unit
FIG. 10 Detail C showing isometric view of the general arrangement of the diaphragm and energy storage elements at the bridge bearing support
FIG. 11 Isometric view of the arrangement of a segment of the energy storage unit at the bridge bearing support
FIG. 12 Details of the assembly of air pressure release unit
FIG. 13 Application: utilizing the sea-crossing bridge as mass Energy Storage Bridge
FIG. 14 Application: utilizing city highway bridges as small Energy Storage Bridge for supplying to the local community hot water and compressed air for air-conditioning using ACAC technology
FIG. 15 Design Principle of the Energy Storage Bridge
FIG. 16 Optional cross section of Energy Storage Bridge

FIG. 1 shows the general arrangement of the Energy Storage Bridge (ESB). Since the bridge has to be designed to take on the expansion/contraction of the bridge deck due to temperature variation, movement joints (MJ) are used at approximately every 500 m or less if continuous bridge structures are used. The bridge deck is separated at the MJ. The piping elements are therefore terminated at the MJs, resulting a storage unit of about 500 m length or less. The inlet and outlet pipes are flexible pipes to cater for the bridge deck movement.

The flexible pipes are able to resist high pressure and are available commercially. ESB Units can be linked by high pressure flexible pipes to form a large storage.

Figure 2:
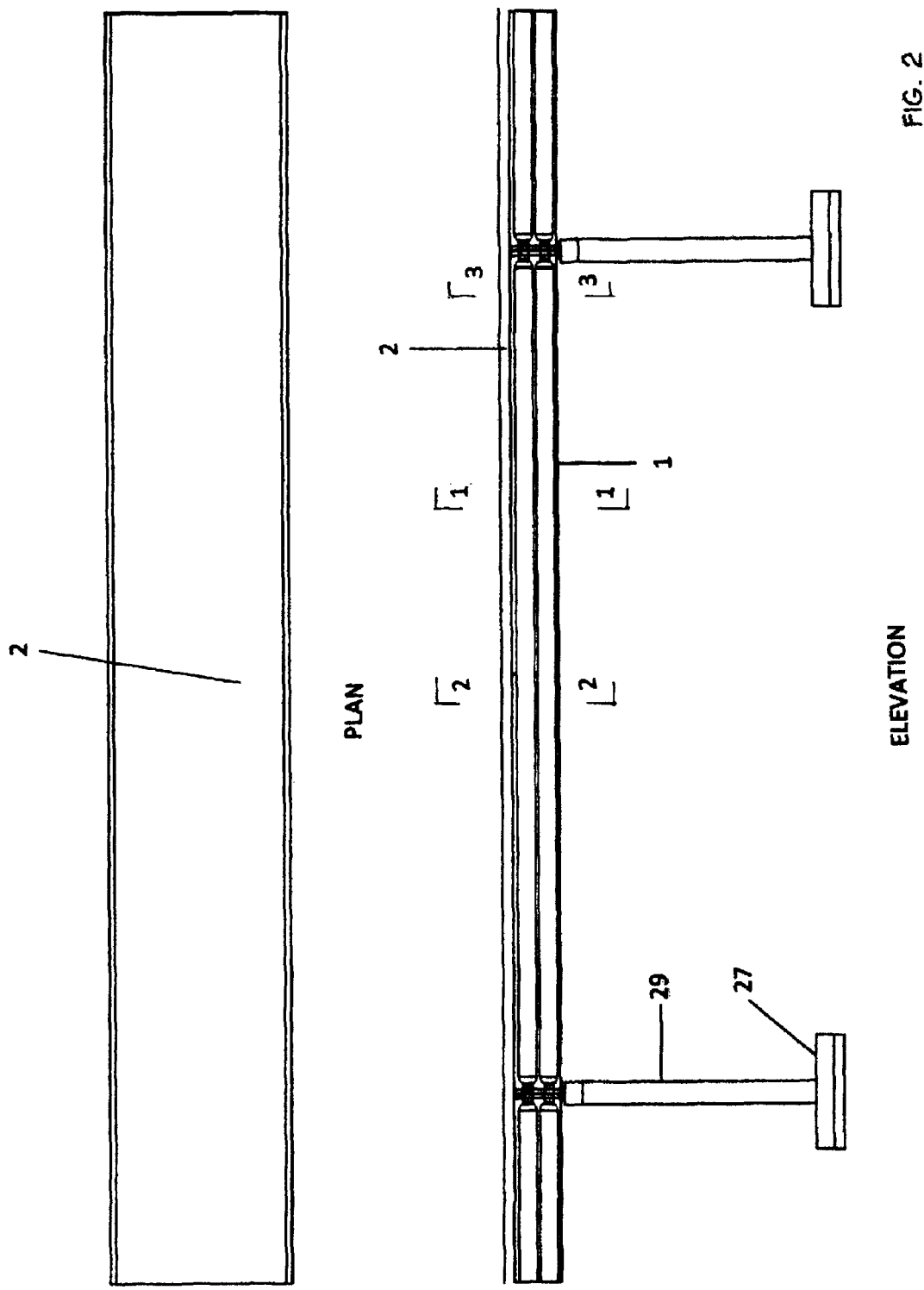

FIG. 2 depicts a segment of a typical span on the plan and in elevation.

Figure 3:
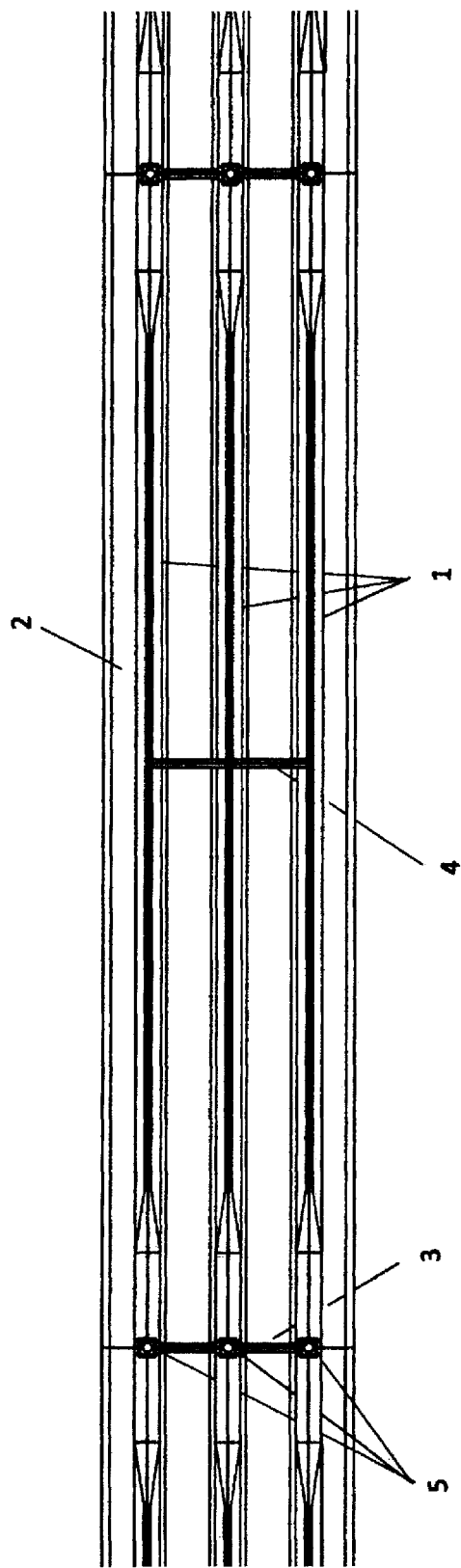

FIG. 3 shows the bottom plan view of the segment. Apart from the CAES steel pipes (1), the deck is provided with support diaphragm (3) and intermediate diaphragm (4) shown here at the midspan. The diaphragm is needed to resist the torsion of the deck due to unsymmetrical vehicle loads. Bearings (5) are used to transfer the vehicle loads to the substructure.

Figure 4:
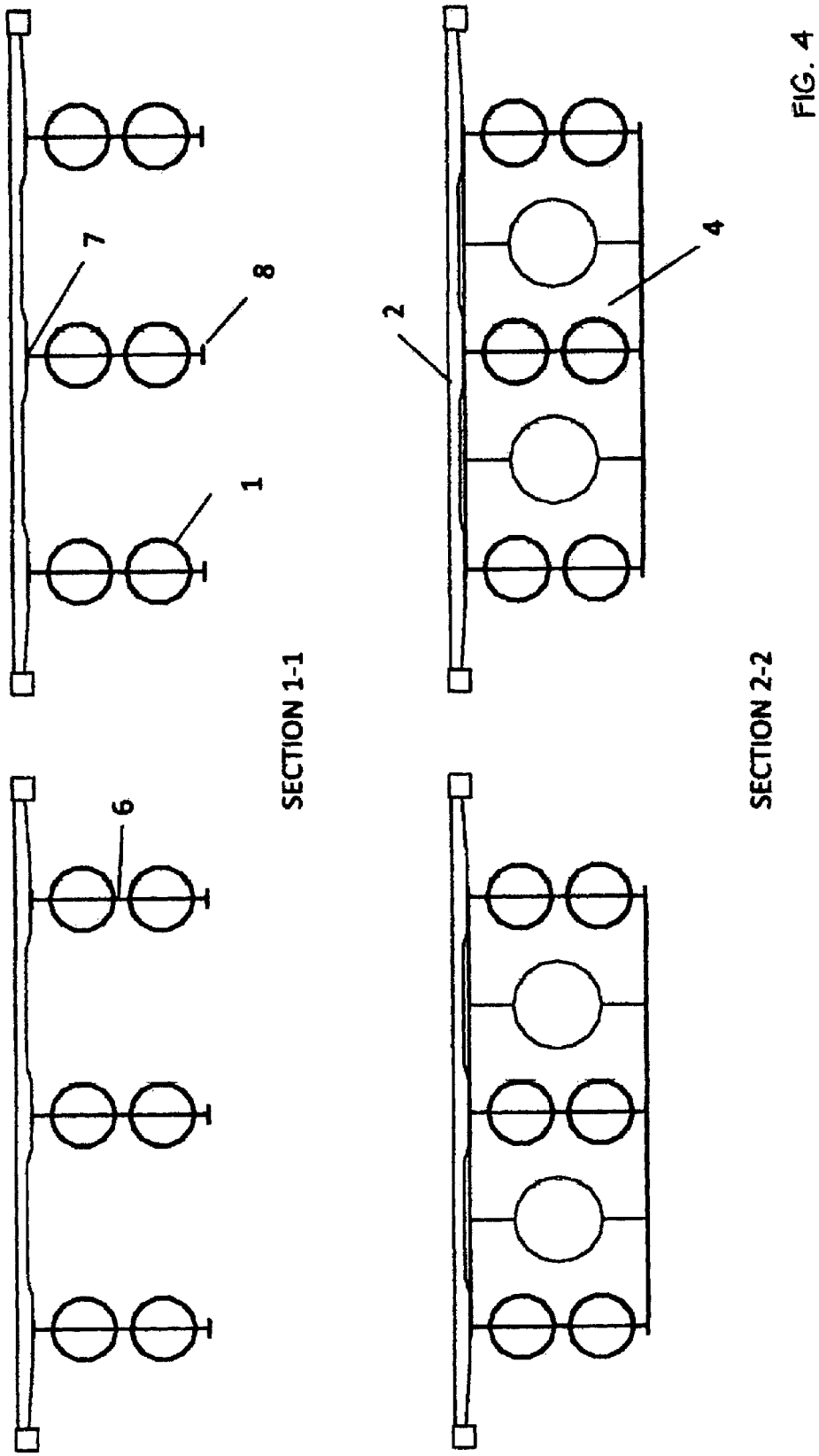
Figure 7:
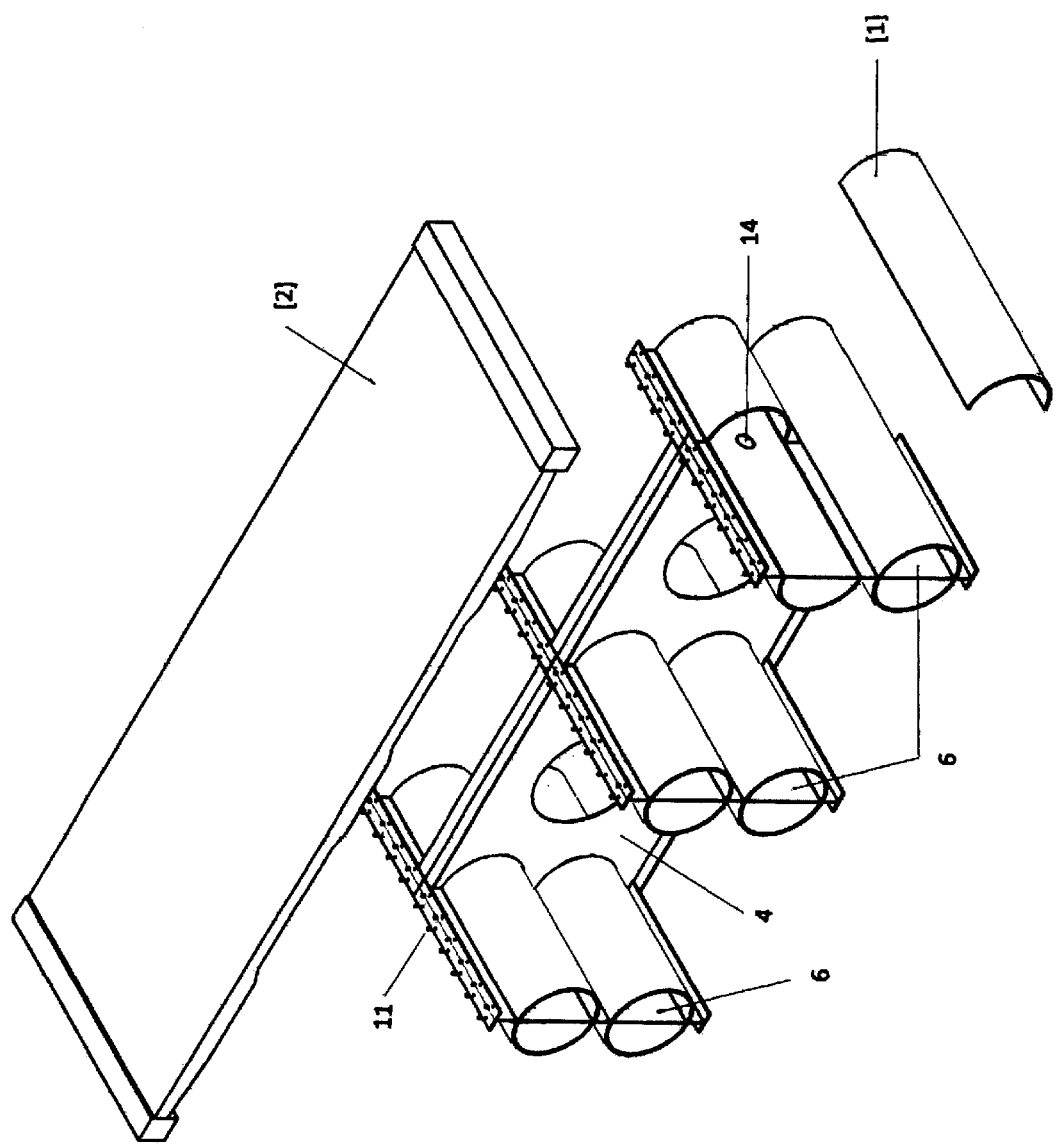

Section 1 of FIG. 4 depicts the cross-section of the deck. Part 1 is the steel pipes which are arranged in pairs in the depth direction. A single large diameter pipe is also possible, see optional cross section in FIG. 16. Part 6 indicates a vertical web plate which connects the pipe (1) at the centre line separating the pipe (1) into two halves. At the top of the web plate (6), a top flange plate (7) is welded to the end of the web plate (6). The top flange (7) is welded with shear connectors (11) as shown in FIG. 7, which is needed for the composite action between the steel part and the concrete slab (2). A small bottom flange plate (8) is welded to the bottom end of the web plate (6).

FIG. 5 shows the section of the deck close to the bridge bearing support. As can be seen, the web (6) is stiffened by the load bearing web stiffeners (10) which are required over the bearing (5) in order to transfer the concentrated load to the substructure. Diaphragm (3) could be replaced by a cross bracing system, see FIG. 16. Note the steel pipe (1) between two consecutive spans is linked by a smaller diameter short pipe (12). The short pipes are needed so that the web stiffeners (10) can have adequate structural width to transfer the loads to the support. This is because the web stiffener (10) should not be welded onto the short pipe (12) for allowing the short pipe to expand under internal air pressure. A clearance of 5 mm is recommended.

Figure 6:
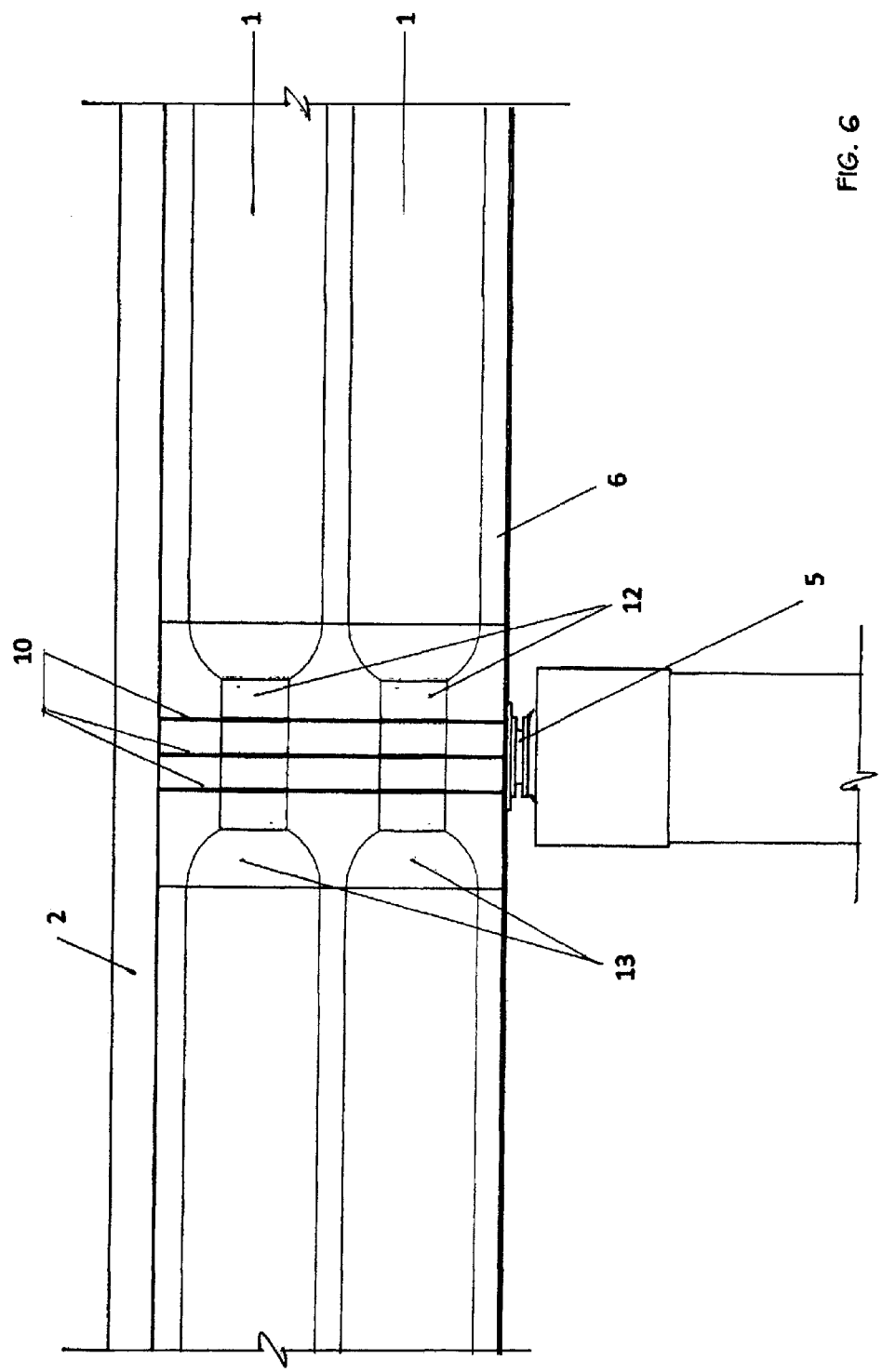

Details A of FIG. 6 depicts the elevation of the storage pipes (1) at the pier support. The bridge dead load and live loads are transmitted to the pier via the webs (6) and the web stiffeners (10) down to the bridge bearing (5). As the load is a concentrated load at the bearing (5), the web plate (6) has to be stiffened by web stiffeners to prevent buckling. The stiffeners (10) should be welded to the web plate (6) only, not to pipes (12). The large diameter pipe (1) is narrow down to about ½ of its diameter and a smaller diameter short pipe (12) is to connect the large diameter pipes (1) at the two adjacent spans. The load bearing stiffeners (10) are therefore having the structural width to be welded to the web plate (6). Part 11 is the shear connector.

FIG. 7 shows the assembly of a segment of the deck. In the cut out pipe, a hole (14) is shown in the web plate (6). This is needed at suitable locations (around midspan where the vertical shear force in the web (6) is less), to let the air inside the pipe move freely so as to balance the internal pressure.

Figure 8:
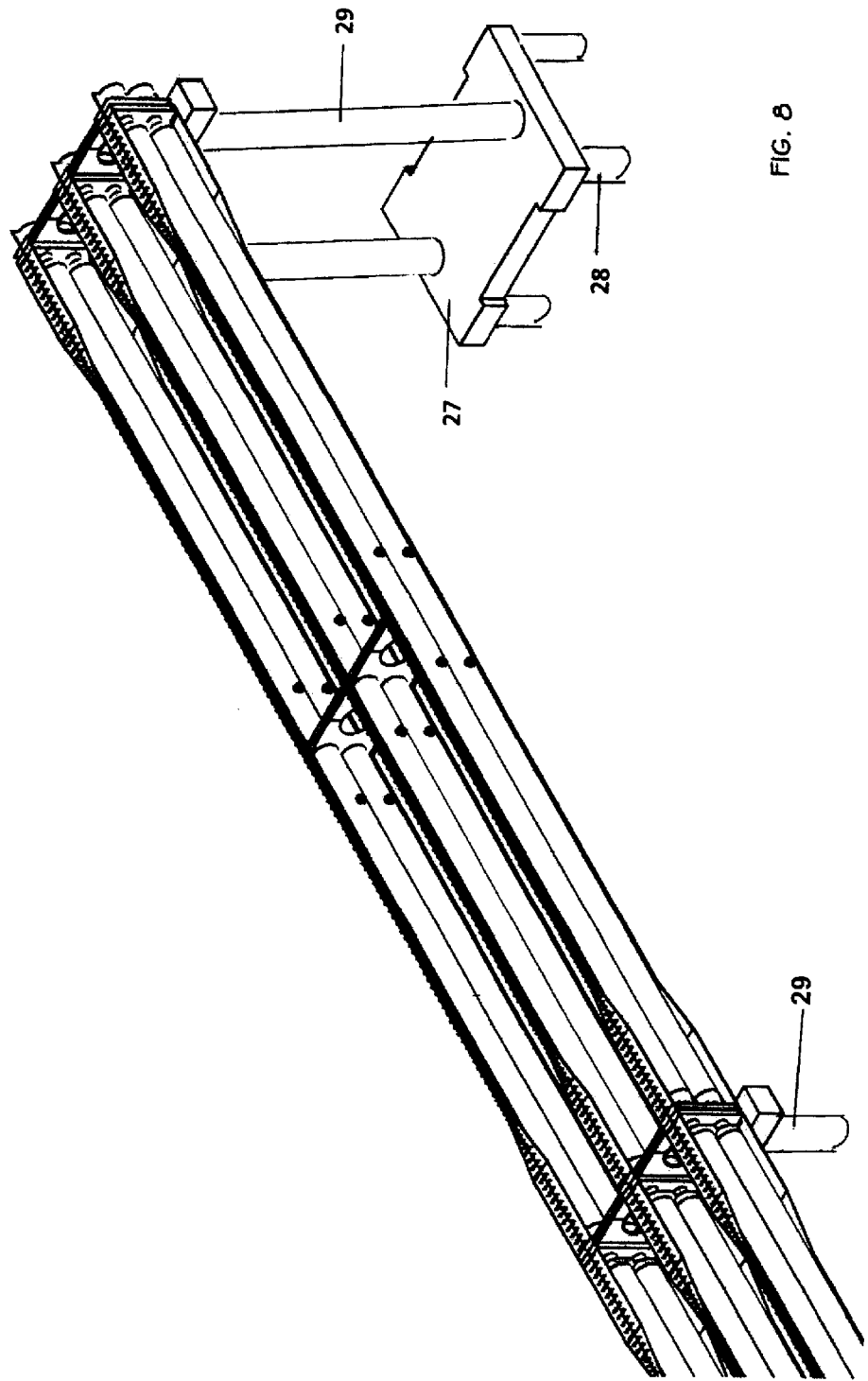

FIG. 8 depicts the skeleton of the piping girder after the concrete slab is removed.

Figure 9:
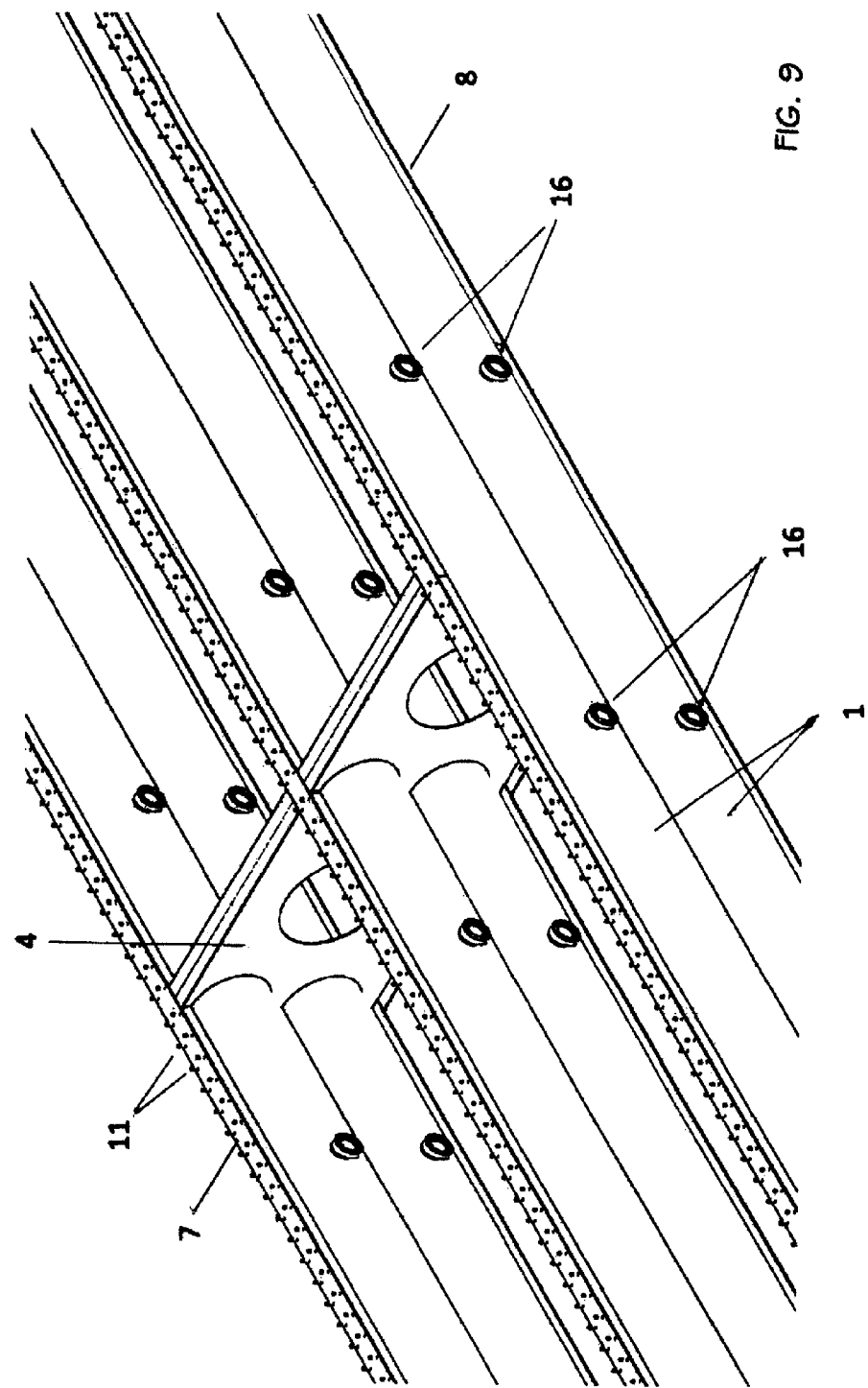

FIG. 9 highlights the arrangement of the intermediate diaphragm (4) and the air pressure release units (16) around the midspan at the mid-depth of the pipe.

Figure 10:
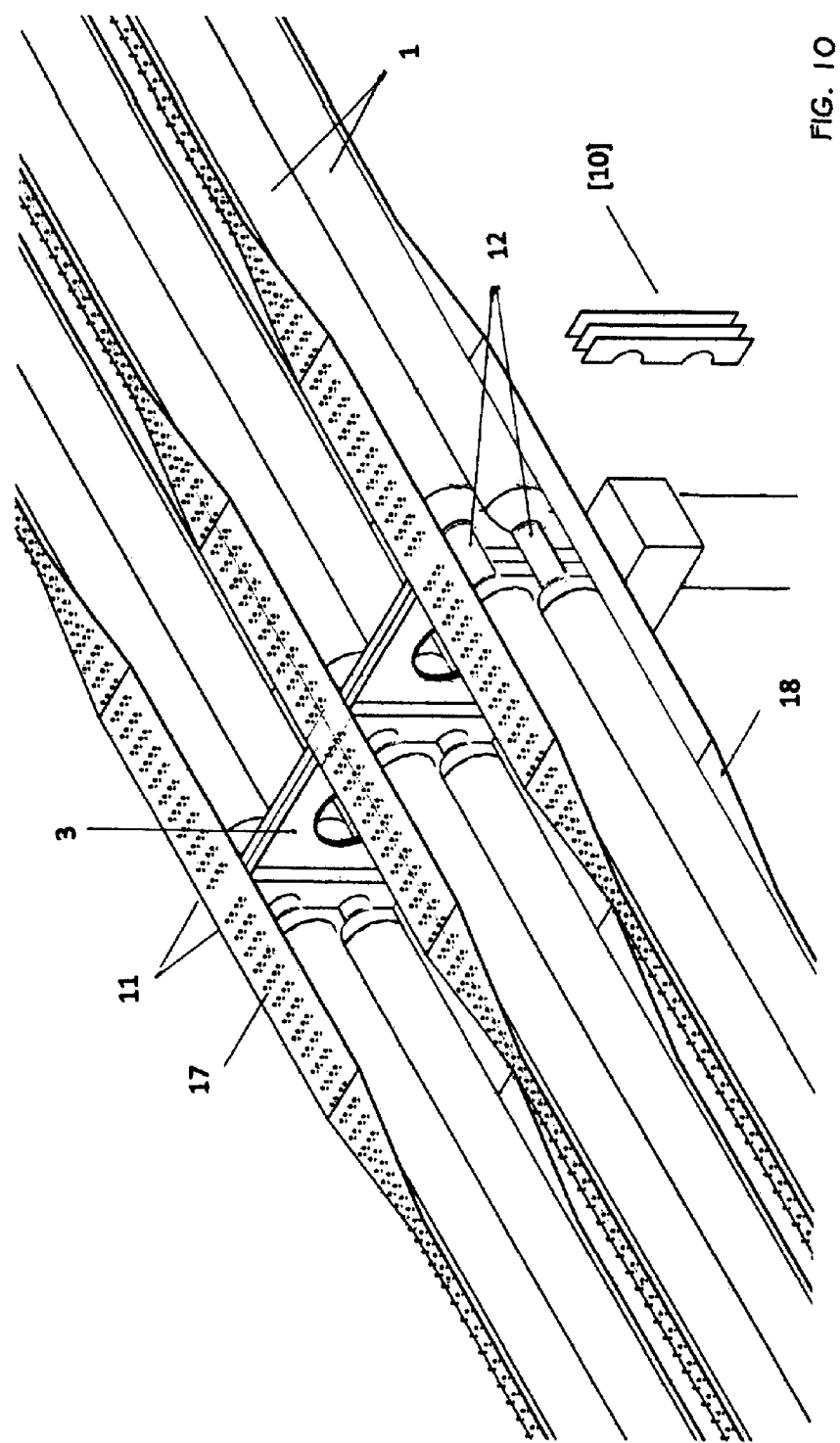

FIG. 10 highlights the arrangement of the support diaphragm, (3), the linkage pipe (12), the load bearing stiffeners (10) and the shear connectors (11). Note that the enlarged top flange (17) over support may be needed to cater for the hogging moment of continuous structures.

Figure 11:
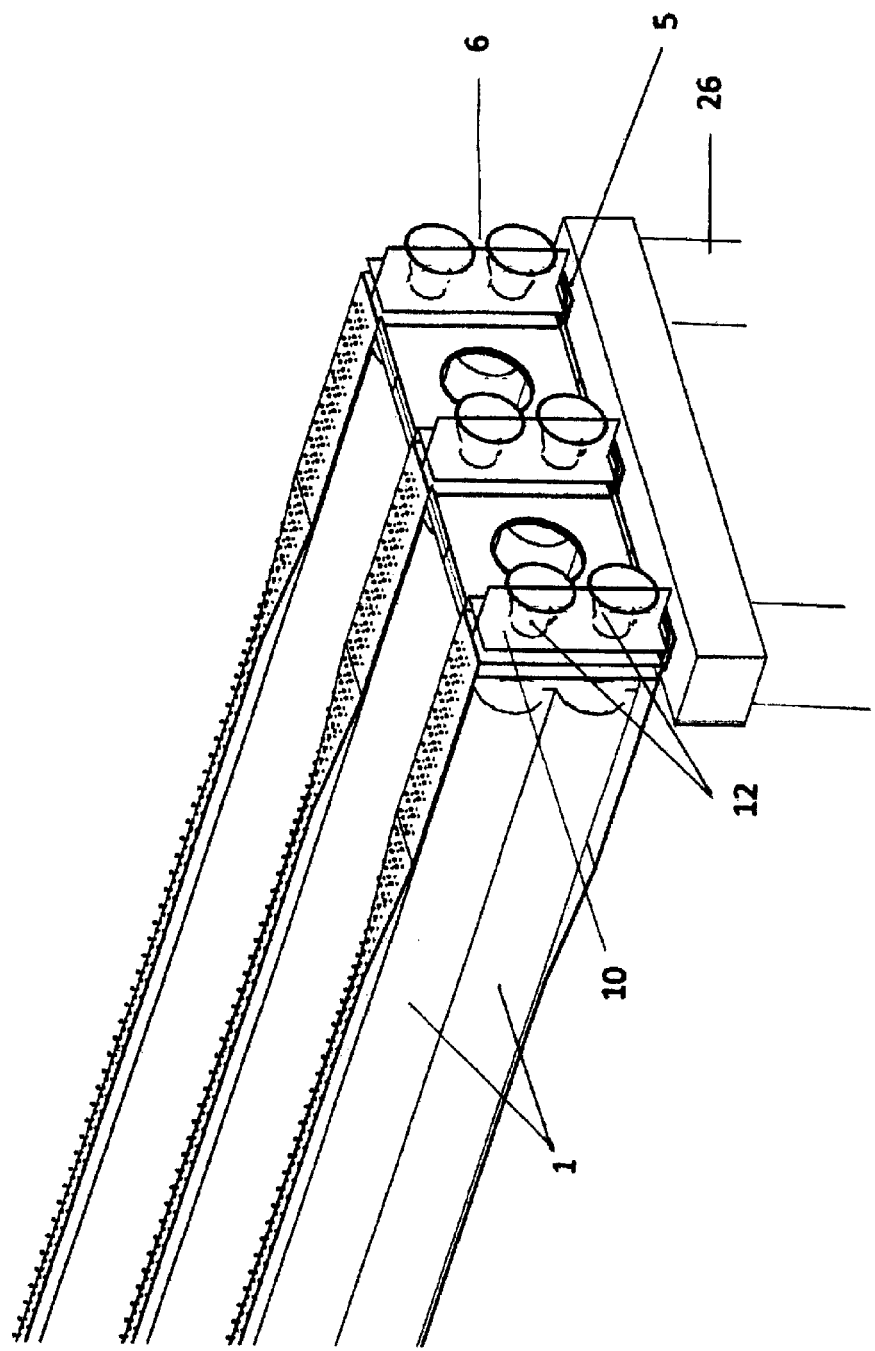

FIG. 11 gives another view of the same details.

The pressure in the pipes could rise above the design highest working pressure, due to heat gained by the steel pipe wall from the surrounding atmosphere, or from any accidental heat due to, for example, a fire accident. The air compressor is unlikely to be able to pump air at pressure beyond its rating since the power input to the compressor cannot overcome the internal pressure. For safety, commercially available pressure release valves located at about ⅛ to ¼ of the span from the support are installed as the first line of safety measurement. The location is chosen on the basis that bending moment of a continuous beam is the least at this location.

Figure 12:
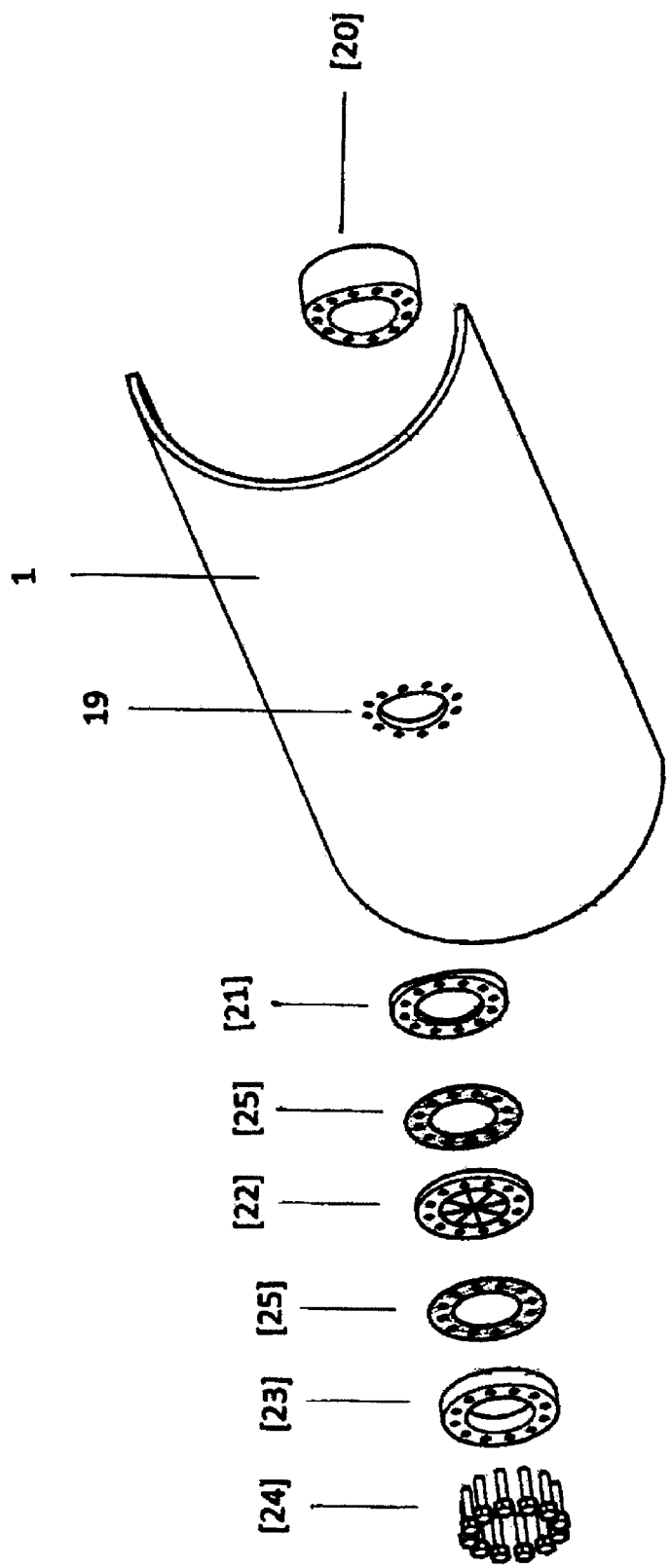

FIG. 12 shows the pressure release unit "Tuned Plate Strength Safety Valve", as the second line safety measurement. It is based on the material strength of the gauge plate (22). The assembly includes a profiled bolt socket (20) which is welded to the wall of the pipe (1), profiled washer (21), gauge plate (22), capping ring (23) and bolts (24). The gauge plate (22) is sandwiched with two flexible sealant rings (25). It is designed to be replaceable.

The gauge plate (22) is pre-formed with grooves as shown. The grooves will help the plate to yield and break along groove lines, under the threshold air pressure. By fine-tuning the plate thickness, groove depth and width and the diameter of the hole, the gauge plate (22) can be designed to yield and break at air pressure below the threshold air pressure that causes damage to the pipe wall (1) but above the threshold air pressure of the release valve (which is commercially available but not shown here). Once it is activated, the gauge plate (22) has to be replaced. The replacement starts with the removal of the capping ring (23) by un-screwing the long bolts (24).

The storage pipes (1) expands radially and axially under the internal pressure. If the expansion is restrained, lock-in stress will be set up. Therefore, the pipes (1) can only be restrained in one direction, as in the case of the web plate (6) that welds to the pipes (1) in the vertical direction. Expansion of the pipes (1) is then taken place in the transverse direction. By so doing, the expansion will not cause significant lock-in stress. A variation is to weld two webs, one each side of the pipe as shown in FIG. 16. The pipe should be large diameter so that work spacing is adequate.

Diaphragm (3), (4) can be substituted by cross frame as shown in FIG. 16. The diaphragms or any substituted cross-frame should not be connected to the side of the pipes (1). The diaphragm (3), (4) is detailed to have a gap between the pipe (1) and itself. The gap should be estimated by calculating the radial displacement of the pipe under the maximum air pressure.

Figure 13:
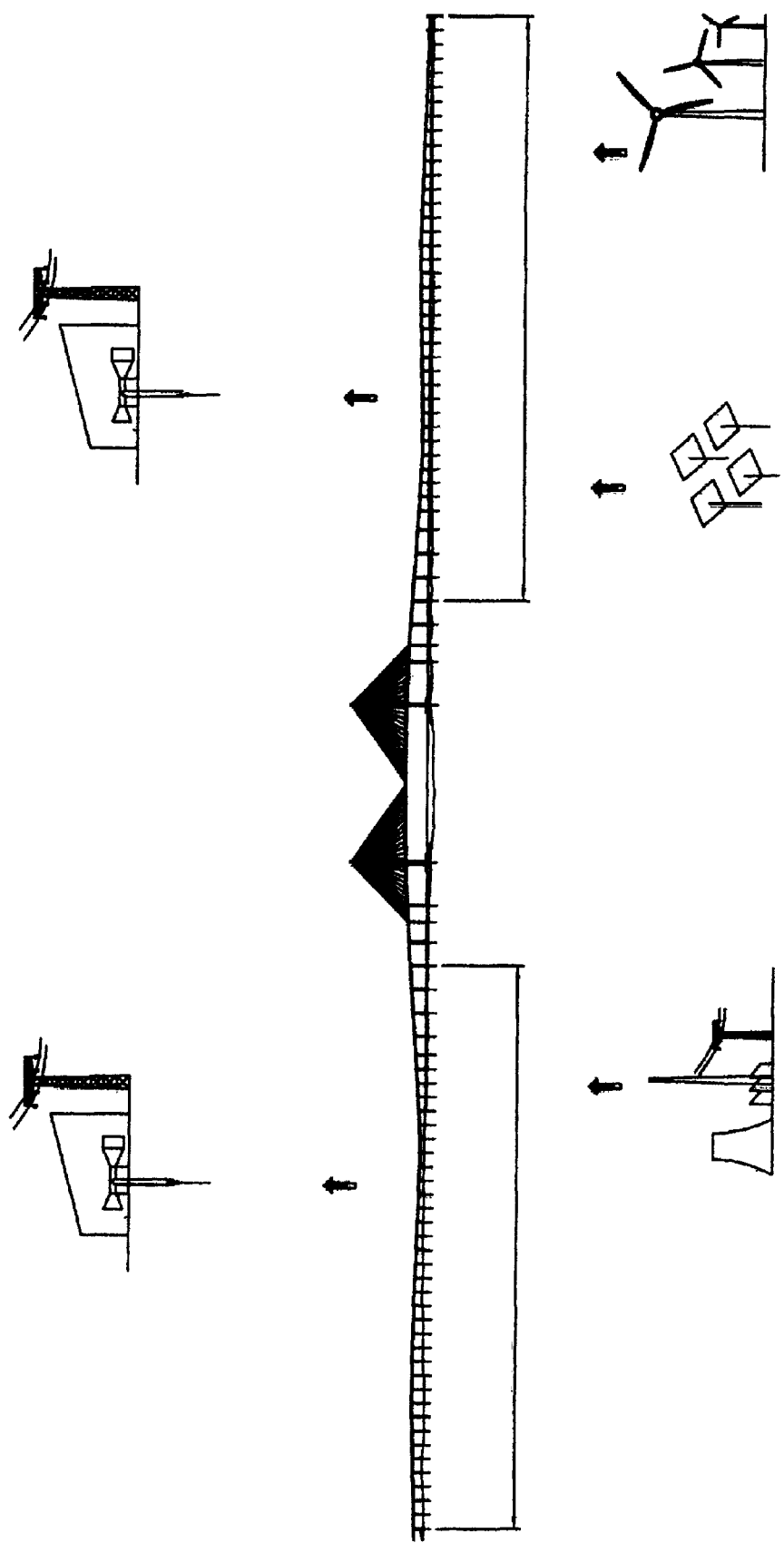

Applications:

FIG. 13 shows the schematic application of the ESB to Sea-Crossing bridges. As these bridge crossings are all in great length such as the Sunshine Bridge of the USA, Oresund Bridge between Demark and Sweden, Hang Zhou Wan Bridge and Dong Hai Bridge of China, the storage they provide can be used as mass energy storage. Except for the main bridge in the navigation channel, the approach viaduct is well suit for Energy Storage Bridge. For a dual carriageway bridge of 10 km in length, using a total of 6×2/1.5 m diameter pipes, the storage volume is $6 \times 2 \times (\pi \times 1.5^2/4) \times 10,000 = 212,057$ m$^3$. Comparing the figure with the storage volume in the Huntorf plant (140,000 m$^3$ and 170,000 m$^3$) and the McIntosh plant (166,125 m$^3$) the storage provided by the sea-crossing bridge is significant. For compressed air of 80 bars in the pipe, total energy can be estimated as P.V=8 MN/m$^2$×212,000=1,696,000 MJ=471 MW-h. This puts it in the same class as the McIntosh plant.

Figure 14:
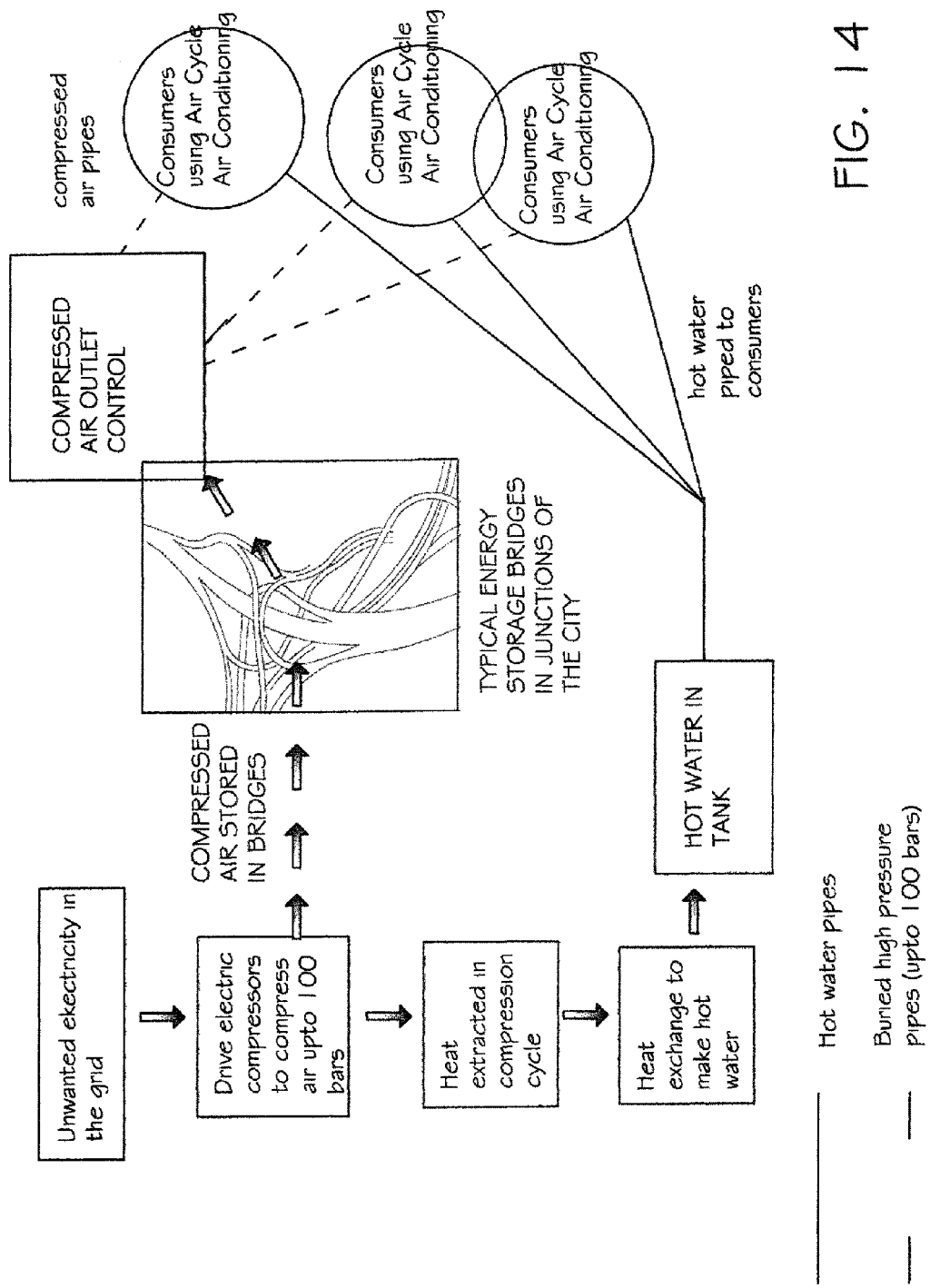

FIG. 14 shows the schematic application of ESB to city road bridges which are many in numbers but not in lengths. It is usually wide and the length averages from several hundred meters to kilometer long. For city bridges of over 1.0 km length with at least 3 lanes, the stored energy using the same structural form is $6 \times 2 \times \pi \times 1.5^2/4 \times 1000 \times 8 = 170,000$ MJ=47 MW-h.

This is about 1/10 of the storage capacity of the McIntosh plant. This can be used as small energy storage for the local community. The stored compressed air can serve the community directly without the need to be converted back to electricity. FIG. 14 shows an application of the stored compressed air in providing hot water and cool air to the local community for air conditioning.

The principle is that the heat is extracted when the air is compressed and the heat is used to heat water which is then stored in heat insulated tank. The compressed air is at temperature close to the ambient temperature (heat has been extracted to allow air to be compressed to ambient temperature). When the compressed air is decompressed and expands it will absorb heat—a so-called "Air Cycle Air Conditioning" (ACAC)[3]. The ACAC technology has been widely used in the commercial aircraft to provide air conditioning to the cabin. In the airplane, the compressed air comes from the aircraft turbo-fan engine. In this application, air is compressed by electric compressors during the low demand sessions of the day when the reserve of power in the grid is unwanted and is otherwise wasted if nobody takes it.

[3] Air conditioning Thermodynamics, California Env. Protection Agency, Air Resources Board, Jul. 21, 2004.

Unlike refrigerant based "Vapor Compression Cycle" air-conditioning, ACAC is refrigerant free hence it will not cause damage to the environment. In practice, the Bridge Storage Unit should be designed to store at least one-day power consumption in Energy for air-conditioning so that it can provide 24 hours service. This can be done with tandem storage units. The hot water and compressed air will supply to the local community by buried pipes.

This application has multiple benefits on environment:

It saves the unwanted electricity in the grid.

It turns the unwanted energy into wanted hot water and air-conditioning using refrigerant free ACAC technology.

It improves the indoor air quality by ducting fresh cool air into the room, instead of circulating the indoor air as it does in the conventional air-conditioning.

All the technologies are available and matured. The innovation is the use of bridge body for energy storage using CASE technology and the application of compressed air to providing hot water and air-conditioning to the local community of that the bridge belonging to.

Design Guidelines

Figure 15:
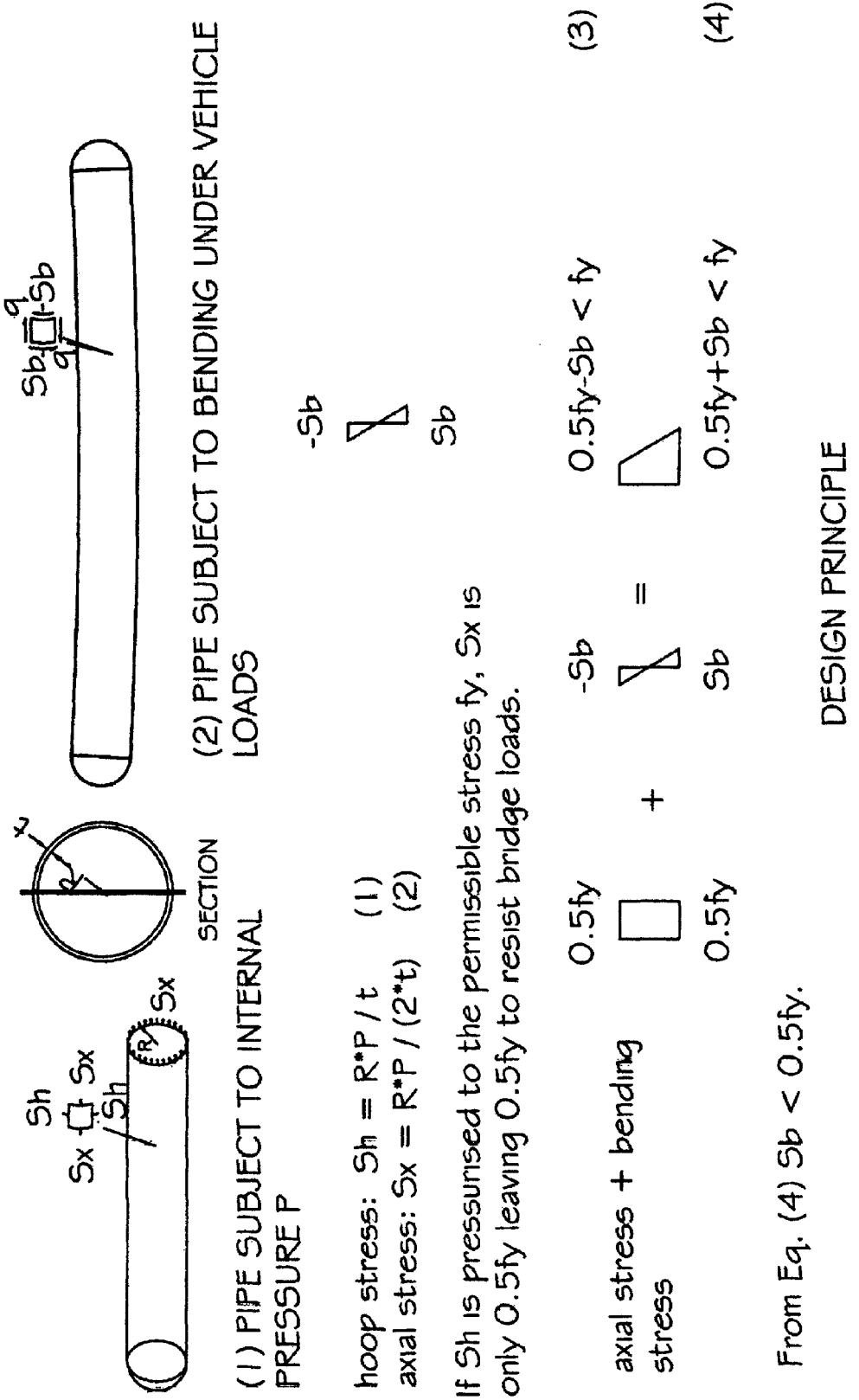

This part is to illustrate how the invention should be designed to achieve dual functions without the need to pay in full for each function. The stress in the steel pipe (1) subject to an internal air pressure can be calculated by classical method according to Timoshenko and Woinowsky-Kriegers textbook "Theory of Plate and Shell", McGraw-Hill Book Co., 2$^{nd}$ Ed., N.Y. 1959. Details of the design principle are illustrated in FIG. 15.

What is claimed is:

1. An Energy Storage Bridge, comprising:
   a plurality of bridge girders, comprising:
      a plurality of steel pipes, which is adapted to be used as load carrying structural members for the bridge dead load and live loads comprising vehicle loads; and
      a plurality of web plates;
   a bridge deck, which is on the top of the bridge girders;
   wherein the steel pipes are assembled either in a single row or in multiple rows in the structural depth direction to form the girder together with the web plate welded between the two halves of the pipe;
   the bridge girder forms an energy storage unit between two consecutive movement joints of the bridge, and two consecutive storage units are joined by high pressure flexible pipe to form a giant energy storage unit;
   the energy storage unit is provided with inlet and outlet pipes to in-take compressed air from electric compressors driven by the grid power or by regenerated power, and to release the compressed air to generate electricity;
   the bridge girders are at suitable transverse spacing across the width of the bridge deck supporting a concrete slab or a steel deck as the roadway surface; and
   the energy storage bridge is adapted to carry vehicle loads and store energy inside the bridge structural body in a form of compressed air contained in the number of steel pipes.

2. The energy storage bridge of claim 1, wherein the regenerated powers comprises wind and solar energies; the heat extracted from the air compression cycle is used to heat water which is stored in a heat-insulated tank, the water stored in the heat-insulated tank are supplied to the consumers for hot water consumption, the compressed air are supplied to the consumers for compressed air consumption for air conditioning.

3. An Energy Storage Bridge, comprising:
   a plurality of bridge girders, comprising:
      a plurality of steel pipes, which is adapted to be used as load carrying structural members for the bridge dead load and live loads comprising vehicle loads; and
      a plurality of web plates;
   a bridge deck, which is on the top of the bridge girders;
   wherein the steel pipes are assembled either in a single row or in multiple rows in the structural depth direction to form the girder together with two web plates welded to each side of the pipe;
   the bridge girder forms an energy storage unit between two consecutive movement joints of the bridge, and two consecutive storage units are joined by high pressure flexible pipe to form a giant energy storage unit;
   the energy storage unit is provided with inlet and outlet pipes to in-take compressed air from electric compressors driven by the grid power or by regenerated powers, and to release the compressed air to generate electricity;

the bridge girders are at suitable transverse spacing across the width of the bridge deck supporting a concrete slab or a steel deck as the roadway surface; and the energy storage bridge is adapted to carry vehicle loads and store energy inside the bridge structural body in a form of compressed air contained in the number of steel pipes.

4. The energy storage bridge of claim 3, wherein the regenerated powers comprises wind and solar energies; the heat extracted from the air compression cycle is used to heat water which is stored in a heat-insulated tank, the water stored in the heat-insulated tank are supplied to the consumers for hot water consumption, the compressed air are supplied to the consumers for compressed air consumption for air conditioning.

* * * * *